(12) United States Patent
Zhang et al.

(10) Patent No.: US 12,445,889 B2
(45) Date of Patent: Oct. 14, 2025

(54) INTER-NODE INDICATION OF FULL DUPLEX CAPABILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/649,873

(22) Filed: Feb. 3, 2022

(65) Prior Publication Data
US 2023/0247471 A1    Aug. 3, 2023

(51) Int. Cl.
| | |
|---|---|
| *H04W 28/02* | (2009.01) |
| *H04L 5/00* | (2006.01) |
| *H04L 5/16* | (2006.01) |
| *H04W 48/16* | (2009.01) |
| *H04W 72/51* | (2023.01) |

(52) U.S. Cl.
CPC ....... *H04W 28/0215* (2013.01); *H04L 5/0048* (2013.01); *H04L 5/16* (2013.01); *H04W 48/16* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2018/0337756 A1* | 11/2018 | Nam | H04W 72/541 |
| 2020/0052775 A1* | 2/2020 | Nam | H04L 5/14 |
| 2020/0145997 A1* | 5/2020 | Luo | H04W 16/02 |
| 2020/0396621 A1* | 12/2020 | Park | H04J 11/0056 |

OTHER PUBLICATIONS

International Search Report and Written Opinion—PCT/US2023/060546—ISA/EPO—May 8, 2023.
Qualcomm Incorporated: "Resource Management for Enhanced Duplexing", 3GPP TSG RAN WG1 Meeting #102-e, R1-2006825, 3rd Generation Partnership Project, Mobile Competence Centre, 650, Route Des Lucioles, F-06921 Sophia-Antipolis Cedex, France, vol. RAN WG1, No. 20200817-20200828, Aug. 8, 2020 (Aug. 8, 2020), 6 Pages, XP051918275, Proposal 1, page fourth Section "Resource management extensions for enhanced duplexing", page third, p. 1-p. 6.

* cited by examiner

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a network node may transmit, to another network node, an indication of a duplex capability associated with the network node. The network node may receive, from the other network node, a configuration of a resource associated with a communication by the network node, wherein the configuration is based at least in part on the indication of the duplex capability associated with the network node. The network node may perform the communication in accordance with the configuration of the resource. Numerous other aspects are described.

30 Claims, 10 Drawing Sheets

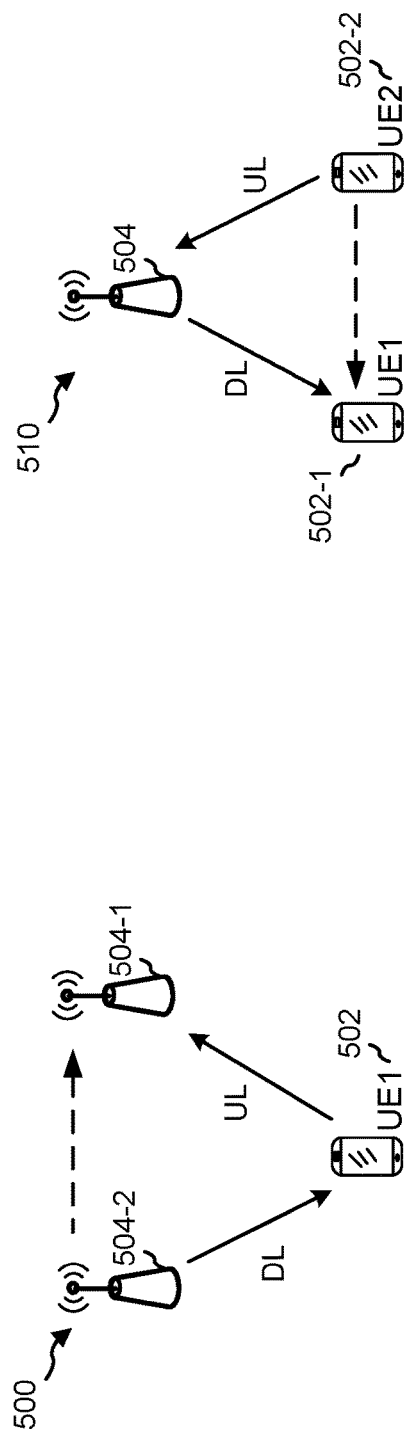
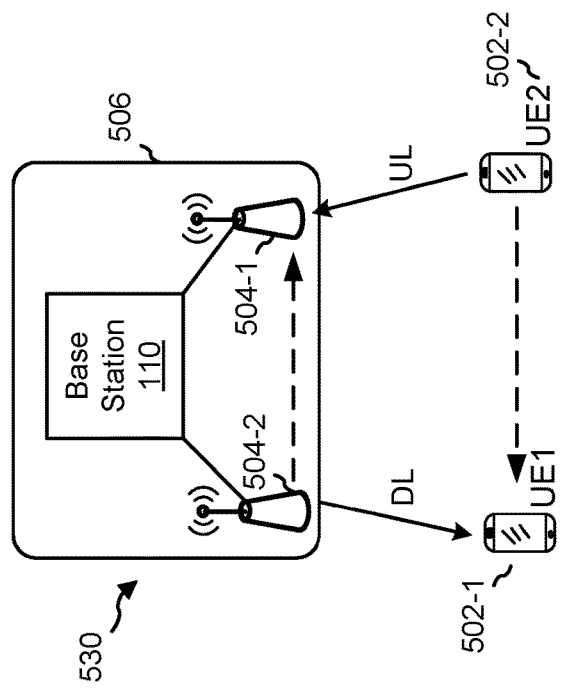
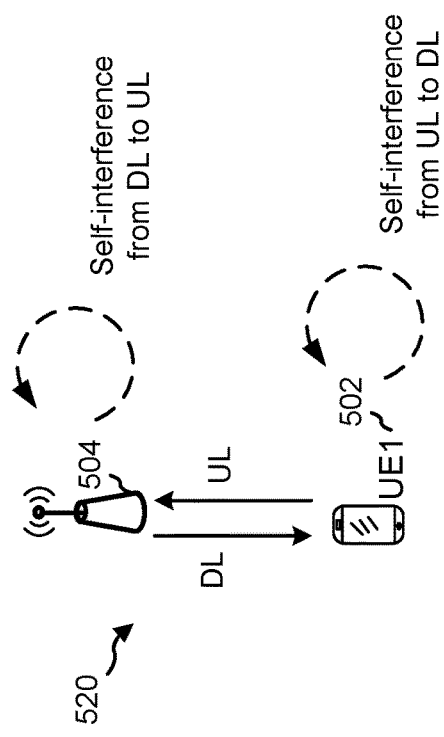
FIG. 5A
FIG. 5B
FIG. 5C
FIG. 5D

INTER-NODE INDICATION OF FULL DUPLEX CAPABILITY

FIELD OF THE DISCLOSURE

Aspects of the present disclosure generally relate to wireless communication and to techniques and apparatuses for inter-node indication of full duplex capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting, to another network node, an indication of a duplex capability associated with the network node. The method may include receiving, from the other network node, a configuration of a resource associated with a communication by the network node, wherein the configuration is based at least in part on the indication of the duplex capability associated with the network node. The method may include performing the communication in accordance with the configuration of the resource.

Some aspects described herein relate to a method of wireless communication performed by a network node. The method may include receiving, from another network node, an indication of a duplex capability associated with the other network node. The method may include configuring a resource associated with a communication by the other network node, wherein configuring the resource is based at least in part on the indication of the duplex capability of the other network node. The method may include transmitting, to the other network node, the configuration of the resource associated with the communication by the other network node.

Some aspects described herein relate to an apparatus for wireless communication at a network node. The apparatus may include a memory and one or more processors coupled to the memory. The one or more processors may be configured to transmit, to another network node, an indication of a duplex capability associated with the network node. The one or more processors may be configured to receive, from the other network node, a configuration of a resource associated with a communication by the network node, wherein the configuration is based at least in part on the indication of the duplex capability associated with the network node. The one or more processors may be configured to perform the communication in accordance with the configuration of the resource.

Some aspects described herein relate to an apparatus for wireless communication at a network node. The apparatus may include a memory and one or more processors coupled to the memory. The one or more processors may be configured to receive, from another network node, an indication of a duplex capability associated with the other network node. The one or more processors may be configured to configure a resource associated with a communication by the other network node, wherein configuring the resource is based at least in part on the indication of the duplex capability of the other network node. The one or more processors may be configured to transmit, to the other network node, the configuration of the resource associated with the communication by the other network node.

Some aspects described herein relate to a non-transitory computer-readable medium that stores a set of instructions for wireless communication by a network node. The set of instructions, when executed by one or more processors of the network node, may cause the network node to transmit, to another network node, an indication of a duplex capability associated with the network node. The set of instructions, when executed by one or more processors of the network node, may cause the network node to receive, from the other network node, a configuration of a resource associated with a communication by the network node, wherein the configuration is based at least in part on the indication of the duplex capability associated with the network node. The set of instructions, when executed by one or more processors of the network node, may cause the network node to perform the communication in accordance with the configuration of the resource.

Some aspects described herein relate to a non-transitory computer-readable medium that stores a set of instructions for wireless communication by a network node. The set of instructions, when executed by one or more processors of the network node, may cause the network node to receive, from another network node, an indication of a duplex capability associated with the other network node. The set of instructions, when executed by one or more processors of the network node, may cause the network node to configure a resource associated with a communication by the other network node, wherein configuring the resource is based at least in part on the indication of the duplex capability of the other network node. The set of instructions, when executed by one or more processors of the network node, may cause the network node to transmit, to the other network node, the configuration of the resource associated with the communication by the other network node.

Some aspects described herein relate to an apparatus for wireless communication. The apparatus may include means for transmitting, to a network node, an indication of a duplex capability associated with the apparatus. The apparatus may include means for receiving, from the network node, a configuration of a resource associated with a communication by the apparatus, wherein the configuration is based at least in part on the indication of the duplex capability associated with the apparatus. The apparatus may include means for performing the communication in accordance with the configuration of the resource.

Some aspects described herein relate to an apparatus for wireless communication. The apparatus may include means for receiving, from a network node, an indication of a duplex capability associated with the network node. The apparatus may include means for configuring a resource associated with a communication by the network node, wherein configuring the resource is based at least in part on the indication of the duplex capability of the network node. The apparatus may include means for transmitting, to the network node, the configuration of the resource associated with the communication by the network node.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D are diagrams illustrating examples of full duplex communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
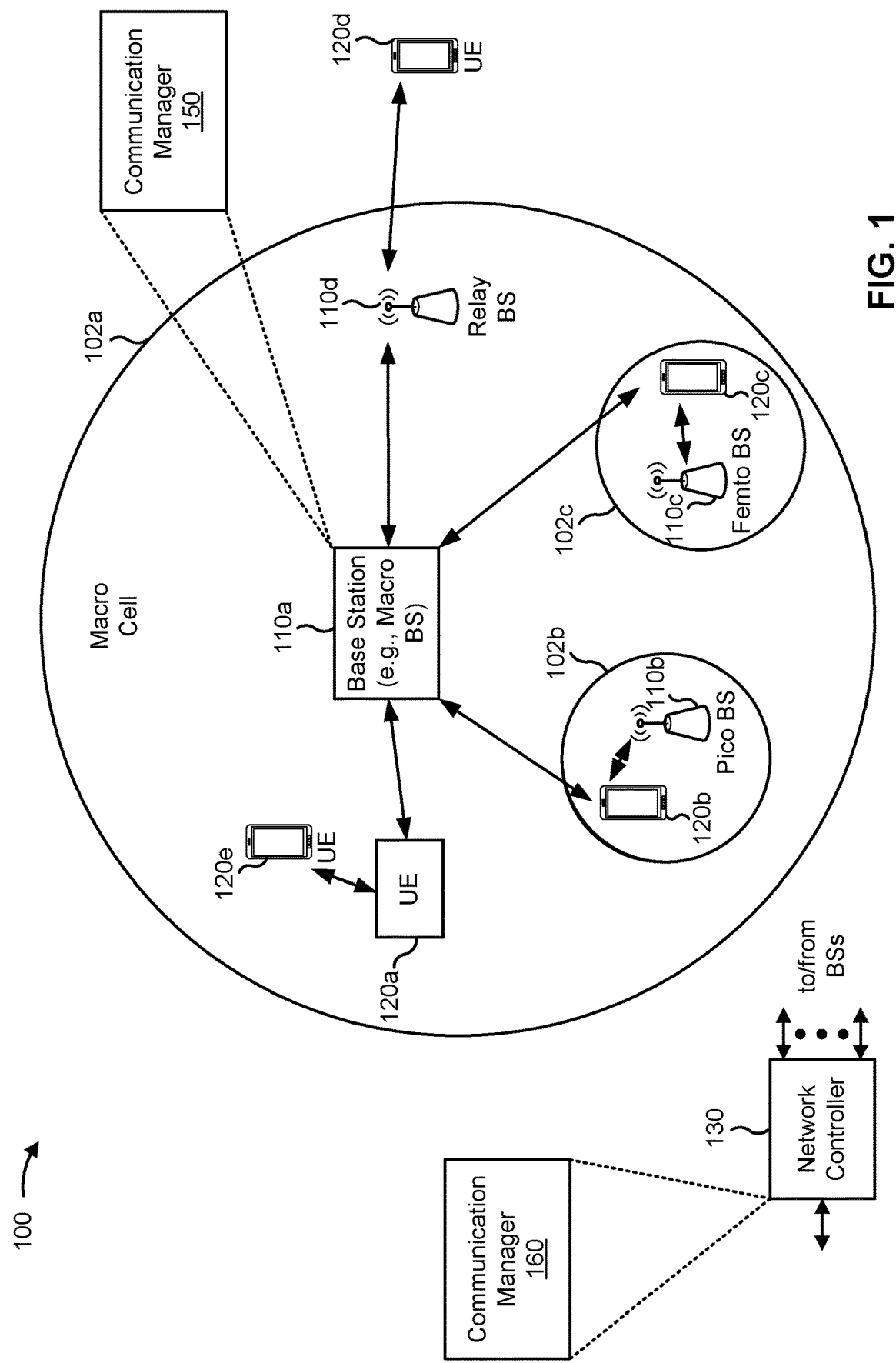
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 (which may be one example of a network node) may include a communication manager 150. Additionally, or alternatively, although not shown in FIG. 2, the communication manager 150 may be located at the network controller 130 (which may be another example of a network node) and/or be otherwise associated with the network controller 130. As described in more detail elsewhere herein, the communication manager 150 may transmit, to another network node, an indication of a duplex capability associated with the network node; receive, from the other network node, a configuration of a resource associated with a communication by the network node, wherein the configuration is based at least in part on the indication of the duplex capability associated with the network node; and perform the communication in accordance with the configuration of the resource.

In some aspects, the communication manager 150 may receive, from another network node, an indication of a duplex capability associated with the other network node; configure a resource associated with a communication by the other network node, wherein configuring the resource is based at least in part on the indication of the duplex capability of the other network node; and transmit, to the other network node, the configuration of the resource associated with the communication by the other network node. Additionally, or alternatively, the communication manager 150 may perform one or more other operations described herein.

In some aspects, the network controller 130 (which may be one example of a network node) may include a communication manager 160. Additionally, or alternatively, although not shown in FIG. 2, the communication manager 160 may be located at the base station 110 (which may be another example of a network node) and/or be otherwise associated with the base station 110. As described in more detail elsewhere herein, the communication manager 160 may transmit, to another network node, an indication of a duplex capability associated with the network node; receive, from the other network node, a configuration of a resource associated with a communication by the network node, wherein the configuration is based at least in part on the indication of the duplex capability associated with the network node; and perform the communication in accordance with the configuration of the resource.

In some aspects, the communication manager 160 may receive, from another network node, an indication of a duplex capability associated with the other network node; configure a resource associated with a communication by the other network node, wherein configuring the resource is based at least in part on the indication of the duplex capability of the other network node; and transmit, to the other network node, the configuration of the resource associated with the communication by the other network node. Additionally, or alternatively, the communication manager 160 may perform one or more other operations described herein.

As indicated above, FIG. 1 is provided as an example. Other examples may differ from what is described with regard to FIG. 1.

Figure 2:
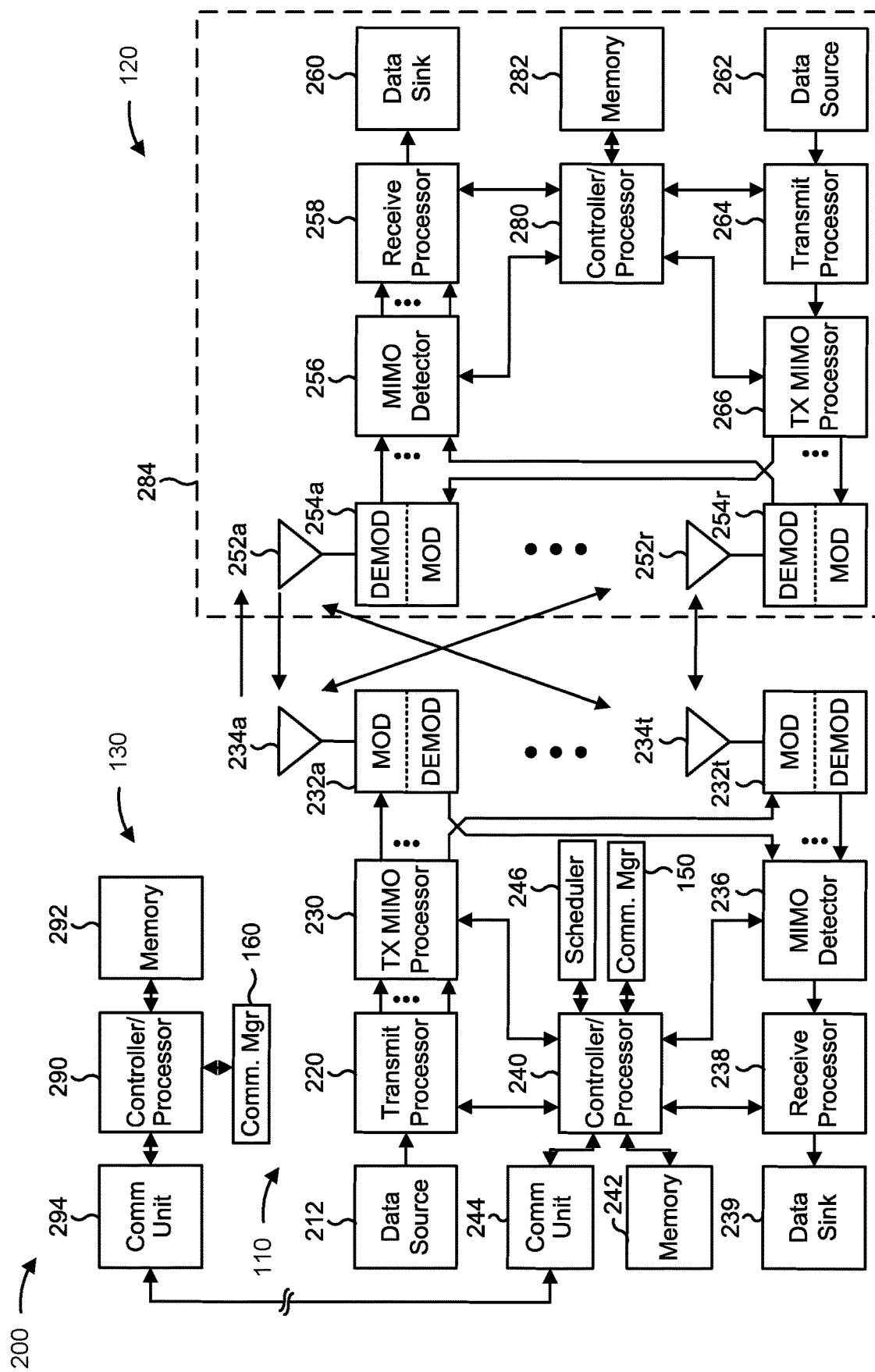
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1). In some aspects, the base station 110 may be referred to as a network node or else may form part of a network node, as is described in more detail in connection with FIG. 6.

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

Although for ease of description the base station 110 is described as a single network entity, aspects of the disclosure are not so limited. In some other aspects, the base station 110 or another network entity may be disaggregated according to an open radio access network (O-RAN) architecture or similar architecture. The O-RAN architecture may include a control unit (CU) that communicates with a core network via a backhaul link. Furthermore, the CU may communicate with one or more distributed units (DUs) via respective midhaul links. The DUs may each communicate with one or more radio units (RUs) via respective fronthaul links, and the RUs may each communicate with respective UEs 120 via radio frequency (RF) access links. The DUs and the RUs may also be referred to as O-RAN DUs (O-DUs) and O-RAN RUs (O-RUs), respectively.

In some aspects, the DUs and the RUs may be implemented according to a functional split architecture in which functionality of a base station 110 (e.g., an eNB or a gNB) is provided by a DU and one or more RUs that communicate over a fronthaul link. Accordingly, as described herein, a base station 110 may include a DU and one or more RUs that may be co-located or geographically distributed. In some aspects, the DU and the associated RU(s) may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU may correspond to a logical unit that includes one or more base station functions to control the operation of one or more RUs. For example, in some aspects, the DU may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU. The RU(s) controlled by a DU may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) handle all over the air (OTA) communication with a UE 120, and real-time and non-real-time aspects of control and user plane communication with the RU(s) are controlled by the corresponding DU, which enables the DU(s) and the CU to be implemented in a cloud-based RAN architecture.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. In some aspects, the network controller 130 may be referred to as a network node or else may form part of a network node, as is described in more detail in connection with FIG. 6. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, the controller/processor of the network controller 130, and/or any other component(s) of FIG. 2 may perform one or more techniques associated with inter-node indication of full duplex capability, as described in more detail elsewhere herein. In some aspects, the network node described herein is the base station 110, is included in the base station 110, or includes one or more components of the base station 110 shown in FIG. 2. In some other aspects, the network node described herein is the network controller 130, is included in the network controller 130, or includes one or more components of the network controller 130 shown in FIG. 2. For example, the controller/processor 240 of the base station 110, the controller/processor 280 of the UE 120, the controller/processor 290 of the network controller 130, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the network node includes means for transmitting, to another network node, an indication of a duplex capability associated with the network node; means for receiving, from the other network node, a configuration of a resource associated with a communication by the network node, wherein the configuration is based at least in part on the indication of the duplex capability associated with the network node; and/or means for performing the communication in accordance with the configuration of the resource. In some aspects, the means for the network node to perform operations described herein may include, for example, one or more of communication manager 150, communication manager 160, transmit processor 220, TX MIMO processor 230, modem 232, antenna 234, MIMO detector 236, receive processor 238, controller/processor 240, memory 242, scheduler 246, controller/processor 290, memory 292, or communication unit 294.

In some aspects, the network node includes means for receiving, from another network node, an indication of a duplex capability associated with the other network node; means for configuring a resource associated with a communication by the other network node, wherein configuring the resource is based at least in part on the indication of the duplex capability of the other network node; and/or means for transmitting, to the other network node, the configuration of the resource associated with the communication by the other network node. In some aspects, the means for the network node to perform operations described herein may include, for example, one or more of communication manager 150, communication manager 160, transmit processor 220, TX MIMO processor 230, modem 232, antenna 234, MIMO detector 236, receive processor 238, controller/processor 240, memory 242, scheduler 246, controller/processor 290, memory 292, or communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
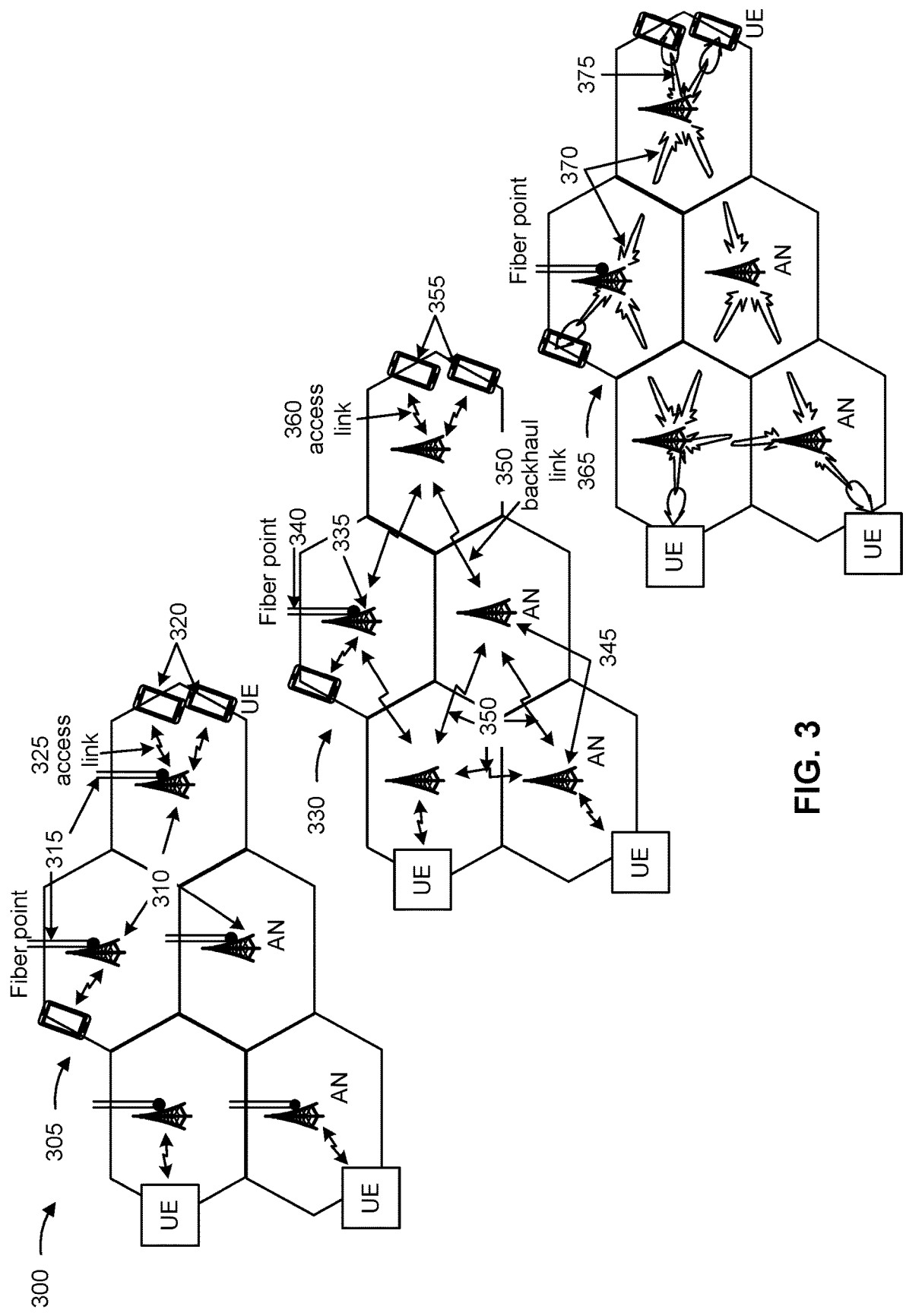
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
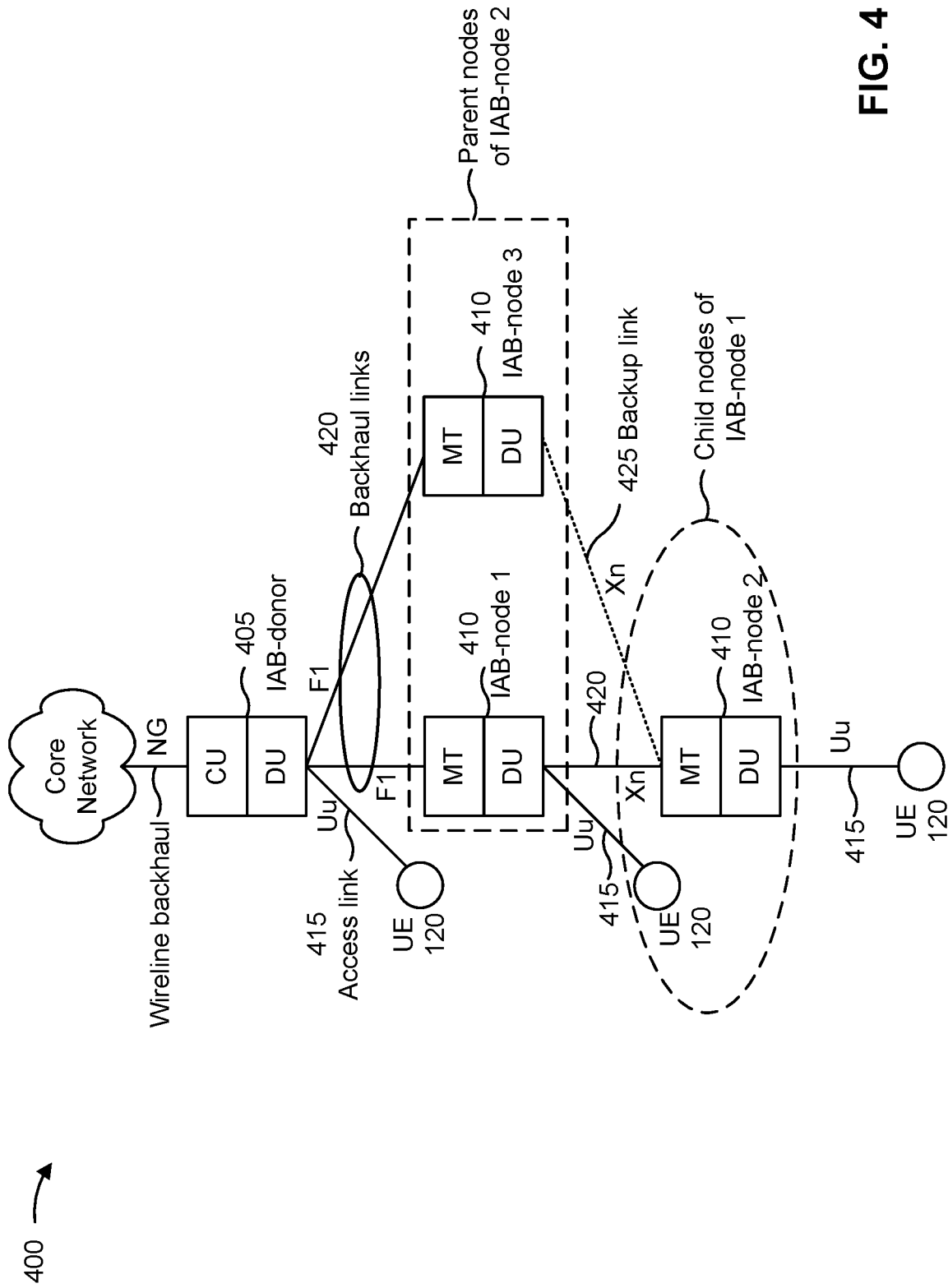
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an NG interface of an IAB donor 405 may terminate at a core network. Additionally, or alternatively, an IAB donor 405 may connect to one or more devices of the core network that provide a core access and mobility management function (e.g., AMF) and/or to one or more devices that provide an operation, administration, and maintenance (OAM) function. In some aspects, an IAB donor 405 may include a base station 110, such as an anchor base station, as described above in connection with FIG. 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message). In some aspects, a link between a CU and a DU may be referred to as an F1 interface.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. The access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network. In some aspects, the access link 415 between a UE 120 and an IAB donor 405, or between a UE 120 and an IAB node 410, may be referred to as the Uu interface.

As further shown in FIG. 4, a link between an IAB donor 405 and an IAB node 410 or between two IAB nodes 410 may be referred to as a backhaul link 420, and is sometimes referred to as an Xn interface. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410. In some aspects, one or more of the network nodes described in connection with FIG. 4 (e.g., one or more of the CU nodes (e.g., the IAB donor 405 or a similar node), DU nodes (e.g., the IAB donor 405, the IAB nodes 410, or similar nodes), MT nodes (e.g., the IAB nodes 410, or similar nodes)) may be capable of operating in a full duplex mode, in which the one or more of the network nodes transmit downlink signals and receive uplink signals simultaneously. Aspects of full duplex operation are described in more detail below in connection with FIGS. 5A-5D.

As indicated above, FIG. 4 is provided as an example. Other examples may differ from what is described with regard to FIG. 4.

FIGS. 5A-5D are diagrams illustrating examples 500, 510, 520, 530 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 500 of FIG. 5A includes a UE1 502 and two network devices (e.g., TRPs) 504-1, 504-2, wherein the UE1 502 is sending uplink transmissions to the network device 504-1 and is receiving downlink transmissions from the network device 504-2. In some aspects, the network device 504 described in connection with FIG. 5 (sometimes referred to as a network node) may be a base station (e.g., the base station 110 described in connection with FIGS. 1 and 2 and/or one of the base stations 310, 335, 345 described in connection with FIG. 3), a TRP associated with (e.g., managed by) a base station or other network device, one of the IAB donor 405 and/or the IAB nodes 410 described in connection with FIG. 4, or a similar network device. In some aspects, the UEs 502 described in connection with FIG. 5 may be the UE 120 described in connection with FIGS. 1, 2, and 4, one of the UEs 320, 355 described in connection with FIG. 3, or a similar UE. In the example 500 of FIG. 5A, FD is enabled for the UE1 502, but not for the network devices 504-1, 504-2. Thus, the network devices 504-1 and 504-2 are half duplex (HD) network devices.

The example 510 of FIG. 5B includes two UEs, UE1 502-1 and UE2 502-2, and a network device 504, wherein the UE1 502-1 is receiving a downlink transmission from the network device 504 and the UE2 502-2 is transmitting an uplink transmission to the network device 504. In the example 510 of FIG. 5B, FD is enabled for the network device 504, but not for the UE1 502-1 and UE2 502-2. Thus, the UE1 502-1 and UE2 502-2 are half duplex UEs.

The example 520 of FIG. 5C includes a UE1 502 and a network device 504, wherein the UE1 502 is receiving a downlink transmission from the network device 504 and the UE1 502 is transmitting an uplink transmission to the network device 504. In the example 520 of FIG. 5C, FD is enabled for both the UE1 502 and the network device 504. In the example 520 of FIG. 5C, the UE1 502 and the network device 504 communicate using a beam pair. A beam pair may include a downlink beam and an uplink beam. For example, a UE1 502 may use a beam pair that includes a downlink beam (that is, a receive beam) at the UE1 502 and an uplink beam (that is, a transmit beam) at the UE1 502 to communicate with the network device 504. The network device 504 may use a downlink beam (that is, a transmit beam) at the network device 504 to transmit communications received via the UE1 502's downlink beam, and may use an uplink beam (that is, a receive beam) at the network device 504 to receive communications transmitted via the UE1 502's uplink beam.

The example 530 of FIG. 5C includes a base station 110 and two network devices 504-1 and 504-2 associated with a cell (such as, e.g., a cell 102 described in connection with FIG. 1). In some aspects, the base station 110 and the network devices 504-1 and 504-2 collectively form a network node 506. More particularly, the base station 110, the first network device 504-1 (e.g., a first TRP), and the second network device 504-2 (e.g., a second TRP) may collectively operate to provide coverage in a cell and/or to provide full duplex operation. For example, the network devices 504-1 and 504-2 may be TRPs managed by the base station 110 that may independently transmit and receive signals and thus collectively operate to provide full duplex communication at the network node 506. Moreover, the network devices 504-1 and 504-2 may be either co-located (e.g., located at the same device, such as at the base station 110 or other device), or may be non-co-located (e.g., located apart from one another and/or from the base station 110, and thus may be standalone devices). In the depicted example, the UE1 502-1 is receiving a downlink transmission from the network node 506 via the second network device 504-2, and the UE2 502-2 is transmitting an uplink transmission to the network node 506 via the first network device 504-1. Thus, in the example 530 of FIG. 5D, FD is enabled for the network node 506, but not for the UE1 502-1 and UE2 502-2. Thus, the UE1 502-1 and UE2 502-2 are half duplex UEs.

In FIGS. 5A-5D, interference is indicated by dashed lines. Interference can occur between nodes of examples 500, 510, 520, 530 (referred to as "crosslink interference" (CLI)). Examples of CLI are shown in FIGS. 5A, 5B, and 5D. In FIG. 5A, network device 504-2's downlink transmission interferes with network device 504-1's uplink transmission. In FIG. 5B, UE2 502-2's uplink transmission interferes with UE1 502-1's downlink transmission. Similarly, in FIG. 5D, UE2 502-2's uplink transmission interferes with UE1 502-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 502 (from an uplink transmission to a downlink reception) and at a network device 504 (from a downlink transmission to an uplink reception) are shown in FIG. 5C. Moreover, an example of self-interference at the network node 506 due to the use or more than one TRP (e.g., interference from a downlink transmission using a second network device 504-2 (e.g., TRP) to a reception using a first network device 504-1 (e.g., TRP)) is shown in FIG. 5D. It should be noted that the above-described CLI and self-interference conditions can occur in HD deployments and in FD deployments.

A network node (e.g., one of network devices 504 and/or the network node 506) operating in a FD mode may result in certain benefits, such as latency reduction because downlink transmissions may be transmitted in uplink slots or the like, as well as spectrum efficiency enhancement, more efficient resource utilization, and coverage enhancement. However, it may be difficult to utilize a network node's full duplex capabilities because the duplex capability of a given network node (e.g., a child node and/or a scheduled node) may be unknown to another network node (e.g., a parent node and/or a scheduling node) that is scheduling resources for uplink and downlink transmissions. For example, when the parent node is a CU network node (e.g., the IAB donor 405 described in connection with FIG. 4) that schedules resources for a DU network node (e.g., one of the IAB nodes 410 described in connection with FIG. 4), the CU network node may be unaware of the DU network node's duplex capability (e.g., whether the DU network node is capable of full duplex communication, and, if so, what full duplex parameters the DU network node is capable of supporting). Additionally, or alternatively, when a parent node is scheduling resources for a child node that includes multiple managed devices or TRPs, such as the network node 506 described in connection with FIG. 5D, the parent node may be unaware of the configurations of the various managed devices associated with the child node and/or the full duplex capability thereof. As a result, the parent node may be unable to schedule resources to be used for fully duplexed communications even if the child node is capable of full duplex operation, resulting in inefficient network resource utilization, increased latency, decreased throughput, decreased coverage, and increased channel congestion and even link failure.

Some techniques and apparatuses described herein enable signaling of a duplex capability of one network node (e.g., a child node and/or a scheduled node, which may be a cell, one or more TRPs, a base station, or the like) to another network node (e.g., a parent node and/or a scheduling node, which may be a CU node, a node associated the core network such as with OAM functions of the core network, or the like) such that the parent node may configure simultaneous and/or overlapping uplink and downlink resources for use by the child node. In some aspects, the overlapping uplink and downlink resources may be used to simultaneously send and receive reference signals used for purposes IAB node discovery, for purposes of measuring inter-node CLI, or the like. More particularly, in some aspects, a network node (e.g., a child node, which may be a DU node and/or which may include one or more TRPs) may transmit, to another network node (e.g., a parent node, which may be a CU node, a node associated with the core network such as an OAM node, or the like), an indication of a duplex capability associated with the network node, and the network node may receive, from the other network node, a configuration of a resource associated with a communication by the network node based at least in part on the indication of the duplex capability of the network node. In some aspects, the indication of the duplex capability may indicate of whether the network node is capable of half duplex operation or full duplex operation, and, if capable of full duplex operation, the indication may indicate corresponding full duplex parameters such as whether the network node is capable of handling fully, partially, or non-overlapping sub-bands, any required guard bands for non-overlapping sub-bands, any maximum overlapping bandwidth restrictions for partially overlapping sub-bands, or the like. In some aspects, the indication may indicate certain combinations of signals that may be fully duplexed, such as a combination of synchronization signal block (SSB) and reference signal communications, a combination of physical downlink shared channel (PDSCH) and physical uplink shared channel (PUSCH) communications, or the like. In some aspects, the indication may indicate whether TRPs associated with the network node are co-located, and/or may indicate a set of SSB signals associated with each TRP that may be configured for full duplex use. As a result, a parent node may become aware of a child nodes' duplex capabilities and thus, when full duplex is supported, schedule overlapping uplink and downlink communications for use by the child node, resulting in latency reduction, spectrum efficiency enhancement, more efficient resource utilization, coverage enhancement, and otherwise more reliable communications.

As indicated above, FIGS. 5A-5D are provided as one or more examples. Other examples may differ from what is described with regard to FIGS. 5A-5D.

Figure 6:
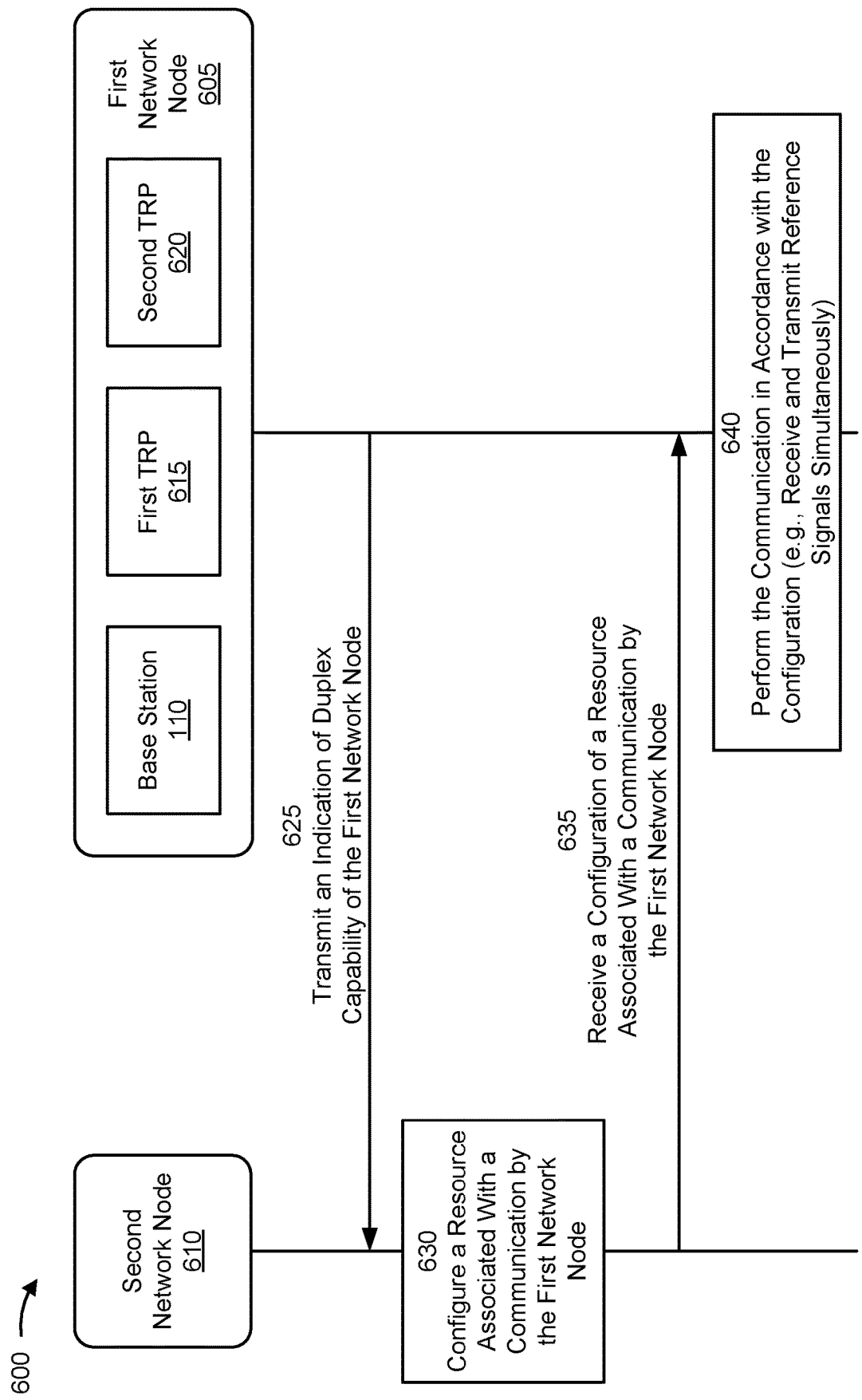
FIG. 6 is a diagram illustrating an example associated with an inter-node indication of a full duplex capability, in accordance with the present disclosure.

FIG. 6 is a diagram illustrating an example 600 associated with an inter-node indication of a full duplex capability, in accordance with the present disclosure. As shown in FIG. 6, a first network node 605 and a second network node 610 may communicate with one another. In some aspects, the network nodes 605, 610 may correspond to one of the network nodes described above, such as one of the base station 110 or network controller 130 described in connection with FIGS. 1 and 2, one of the base stations 310, 335, 345 described in connection with FIG. 3, one of the IAB donor 405 and/or the IAB nodes 410 described in connection with FIG. 4, one of the network devices 504 or network node 506 described in connection with FIG. 5, or a similar network node. Moreover, in some aspects, one or more of the network nodes 605, 610 may include multiple network devices. For example, the first network node 605 may include a base station 110 and one or more managed TRPs, such as a first TRP 615 and a second TRP 620, collectively forming a cell, such as one of the cells 102 described in connection with FIG. 1. As described more fully below, the first TRP 615 and the second TRP 620 may be co-located (e.g., located within the same device, such as within the base station 110) or may be non-co-located (e.g., located in different devices, such as one or more of the TRPs being located in a device different than the base station 110). In some aspects, the second network node 610 may be a parent node and/or a scheduling node, and the first network node 605 may be a child node and/or a scheduled node.

As shown by reference number 625, the first network node 605 may transmit, to the second network node 610, an indication of a duplex capability of the first network node 605. In some aspects, the indication may indicate that the first network node 605 is capable of one of half duplex communication or full duplex communication, as well as any associated full duplex parameters. For example, the indication may indicate that the network node 605 is capable of operating in a full duplex mode, such as described in connection with the network device 504 of examples 510 and 520 shown in FIGS. 5B and 5C, respectively, or as described in connection with the network node 506 of example 530 shown in FIG. 5D.

In some aspects, the second network node 610 may be a CU node (e.g., the IAB donor 405 described in connection with FIG. 4, or the like), and the first network node 605 may be a DU node (e.g., one of the IAB nodes 410 described in connection with FIG. 4, or the like). In some other aspects, the second network node 610 may be another, or neighbor, DU node (e.g., one of the IAB nodes 410 described in connection with FIG. 4, such as the IAB-node 1, the IAB-node 2, the IAB-node 3, or similar node), may be a node associated with the core network such as an OAM node or the like, or may be any other type of network node.

In some aspects, the indication shown at reference number 625 may be transmitted to the second network node 610 via a direct link between the first network node 605 and the second network node 610, such as via an F1 interface or an Xn interface between the first network node 605 and the second network node 610. In some other aspects, the indication shown at reference number 625 may be relayed to the second network node 610 via one or more other network nodes, one or more UEs, or the like. For example, in aspects in which the second network node 610 is associated with the core network (e.g., when the second network node 610 is an OAM node or the like), the indication may be relayed via one or more intermediary network nodes. For example, returning to FIG. 4, the first network node 605 may correspond to one of the IAB nodes 410, while the second network node 610 may correspond to a node at the core network. In such aspects, the indication shown at reference number 625 may be transmitted by the first network node 605 to the IAB donor 405 via the F1 interface (or else to another IAB node 410 via the Xn interface, which then transmits the indication to the IAB donor 405 via the F1 interface), and the IAB donor 405 may then transmit the indication to the second network node 610 at the core network via the NG interface.

In some other aspects, both the first network node 605 and the second network node 610 may be DU nodes, and the indication shown at reference number 625 may be transmitted between the first network node 605 and the second network node 610 via one or more CU nodes. For example, the first network node 605 (e.g., a first DU node, sometimes referred to as DU-1), may transmit the indication to a first CU node (sometimes referred to as CU-1), via an F1 interface or the like. The first CU node (e.g., CU-1) may then transmit the indication to a second CU node (sometimes referred to as CU-2), via an Xn interface or the like. And the second CU node (e.g., CU-2) may transmit the indication to the second network node 610 (e.g., a second DU node, sometimes referred to as DU-2), via an F1 interface or the like. In some aspects, any communications transmitted from the second network node 610 to the first network node 605 (such as a configuration of resources, which will be described in more detail below in connection with reference numbers 630 and 635) may be transmitted in reverse to the order described above.

Additionally, or alternatively, the indication shown at reference number 625 may be transmitted to the second network node 610 via over the air (OTA) signaling. For example, the first network node 605 may transmit the indication to a UE, to another network node (e.g., a base station, a TRP, an IAB node, or the like), or to another intermediary network device using an OTA transmission, and the indication may be forwarded to the second network node 610 by the intermediary network device via one of the interfaces described in connection with FIG. 4 (e.g., the Uu interface, the Xn interface, the F1 interface, the NG interface, or the like).

In some aspects, the indication of the duplex capability of the first network node 605 shown by reference number 625 may indicate whether the first network node 605 is capable of communicating using one of a half duplex operation or a full duplex operation. If the indication indicates the first network node 605 is capable of communicating using a half duplex operation, such as was described in connection with network devices 504-1 and 504-2 of FIG. 5A, then the first network node 605 may only communicate using non-overlapping, in the time domain, uplink and downlink transmissions. Thus, in such aspects, the second network node 610 may only schedule non-overlapping time resources for use by the first network node 605 to receive uplink communications and transmit downlink communications. However, and as described in connection with the network devices 504 of FIGS. 5B and 5C and the network node 506 of FIG. 5D, if the indication indicates the first network node 605 is capable of communicating using a full duplex operation, then the first network node 605 may communicate using overlapping, in the time domain, uplink and downlink transmissions. Thus, in such aspects, the second network node 610 may schedule overlapping time resources for use by the first network node 605 to receive uplink communications and transmit downlink communications.

In some aspects, when the first network node 605 is capable of full duplex operation, the indication shown at reference number 625 may further indicate one or more corresponding full duplex parameters associated with the first network node 605. For example, the indication shown at reference number 625 may further indicate whether the first network node 605 is capable of receiving one of fully overlapping, in the frequency domain, communications, partially overlapping, in the frequency domain, communications, or non-overlapping, in the frequency domain, communications. Moreover, in aspects in which the indication shown at reference number 625 indicates that the first network node 605 is capable of receiving non-overlapping, in the frequency domain, communications, the indication may further indicate a size and/or configuration for a required guard band between two non-overlapping sub-bands. In aspects in which the indication shown at reference number 625 indicates that the first network node 605 is capable of receiving partially overlapping, in the frequency domain, communications, the indication may further indicate a maximum overlapped bandwidth for the partially overlapping sub-bands.

In some aspects, the indication shown at reference number 625 may further indicate one or more other full duplex parameters associated with the first network node 605. For example, in some aspects the duplex capability of the first network node 605 may be dependent upon a type of communication or signal being transmitted in the uplink and/or the downlink, and the indication shown at reference number 625 may thus further indicate a specific combination of uplink/downlink signals supported by the full duplex operation. For example, the indication may indicate that the first network node 605 is capable of transmitting and receiving one or more SSB communications and/or one or more uplink signals (e.g., a reference signal) for purposes of IAB node discovery or the like. More particularly, in some aspects, two IAB nodes and/or an IAB node and a UE may exchange SSB communications and/or reference signals when establishing an initial connection between one another, and thus the indication shown at reference number 625 may indicate that the first network node 605 is capable of receiving and transmitting such signals simultaneously. Additionally, or alternatively, the indication shown at reference number 625 may indicate that the first network node 605 is capable of receiving and transmitting one or more reference signals simultaneously in the uplink and the downlink, respectively, for purposes of performing inter-node CLI measurements (e.g., CLI measurements between two nodes). Additionally, or alternatively, the indication shown at reference number 625 may indicate that the first network node 605 is capable of receiving and transmitting two data transmissions simultaneously (e.g., the indication may indicate that the first network node 605 is capable of simultaneously transmitting a communication in a PDSCH and receiving a communication in a PUSCH). Similar parameters may be further indicated by the indication shown at reference number 625 without departing from the scope of the disclosure.

As shown by reference number 630, the second network node 610 may configure a resource associated with a communication by the first network node 605 based at least in part on the indication of the duplex capability of the first network node 605. More particularly, if the indication shown at reference number 625 indicates that the first network node 605 is capable of only half duplex operation, the second network node 610 may configure non-overlapping time resources for use by the first network node 605 to receive uplink communications and transmit downlink communications. However, if the indication indicates that the first network node 605 is capable of communicating using a full duplex operation, then the second network node 610 may configure overlapping time resources for use by the first network node 605 to receive uplink communications and transmit downlink communications. In aspects in which the indication shown at reference number 625 included additional full duplex parameters, the second network node 610 may further configure the resources accordingly. For example, if the indication shown at reference number 625 indicated that the first network node 605 is capable of handling fully, partially, or non-overlapping, in the frequency domain, communications as described above, the configuration shown at reference number 630 may configure fully, partially, or non-overlapping frequency resources, accordingly.

Moreover, if the indication shown at reference number 625 indicated that the first network node 605 is capable of receiving a specific combination of uplink/downlink signals supported by the full duplex operation, the second network node 610 may configure the resources accordingly. For example, the indication may indicate that the first network node 605 is capable of receiving and transmitting one or more SSB communications and/or one or more reference signals simultaneously in the uplink and the downlink, respectively, for purposes of IAB node discovery and/or CLI measurements, as described above. Thus, the second network node 610 may configure overlapping time resources for sending one of an SSB communication and/or a reference signal and receiving one of an SSB communication and/or a reference signal. Similarly, the indication may indicate that the first network node 605 is capable of simultaneously transmitting a PDSCH communication and receiving a PUSCH communication. Thus, the second network node 610 may configure overlapping time resources for transmitting a PDSCH communication and receiving a PUSCH communication. As shown by reference number 635, the first network node 605 may receive, from the second network node 610, the configuration of the resource associated with the communication by the first network node 605 based at least in part on the indication of the duplex capability of the first network node 605.

As shown at reference number 640, the first network node 605 may perform the communication in accordance with the configuration. For example, if the configuration indicates overlapping time resources for receiving and transmitting communications (e.g., the configuration indicates resources for full duplex operation), the first network node 605 may operate in a full duplex mode. In some aspects, the configuration shown at reference number 635 will include resources for simultaneously transmitting and receiving SSB communications and/or reference signals, as described above. Thus, in such aspects, in the communication shown at reference number 640, the first network node 605 may simultaneously transmit and receive SSB communications and/or reference signals, accordingly. In some other aspects, the configuration shown at reference number 630 will include resources for simultaneously transmitting PDSCH communications and receiving PUSCH communications, as described above. Thus, in such aspects, in the communication shown at reference number 640, the first network node 605 may simultaneously transmit PDSCH communications and receive PUSCH communications, accordingly.

In some aspects, the first network node 605 may operate in a full duplex mode in accordance with the configuration by simultaneously transmitting a downlink communication using the first TRP 615 and by receiving an uplink communication using the second TRP 620. Moreover, in some aspects, the first network node 605 may communicate in a full duplex mode by using a set of SSB beams associated with each TRP 615, 620 for performing the simultaneous communications. For example, the first network node 605 may be associated with multiple SSB beams, which may be static or semi-static beams forming a grid covering the cell area associated with the first network node 605. In such aspects, the first network node 605 may use a first set of the SSB beams, which may be associated with one of the TRPs 615, 620 (e.g., the first TRP 615), for uplink communication, and the first network node 605 may use a second set of the SSB beams, which may be associated with the other of the TRPs 615, 620 (e.g., the second TRP 620), for downlink communication.

In some aspects, the first network node 605 may signal to the second network node 610 information about the TRPs 615, 620 and any associated SSB beams. In some aspects, this information may be provided with the indication shown at reference number 625. For example, the indication shown at reference number 625 may further indicate that the first TRP 615 and the second TRP 620 are one of co-located or non-co-located, and/or may further indicate the corresponding signals (e.g., SSB beams) associated with each that may be configured for full duplex communications, such as for full duplex CLI measurements or the like. Thus, the indication may indicate that a first set of the SSB beams are associated with the first TRP 615 and a second set of the SSB beams are associated with the second TRP 620, and that the first and second set of SSB beams may be used for full duplex CLI measurement. In such aspects, the configuration shown at reference number 630 may configure resources for full duplex CLI measurements using the first and second sets of SSB beams. For example, in a first time period (e.g., using a first resource), the first TRP 615 may transmit one or more CLI reference signals using the first set of SSB beams while the second TRP 620 may receive one or more CLI reference signals using the second set of SSB beams. Then, in a second time period (e.g., using a second resource), the second TRP 620 may transmit one or more CLI reference signals using the second set of SSB beams while the first TRP 615 may receive one or more CLI reference signals using the first set of SSB beams.

As indicated above, FIG. 6 is provided as an example. Other examples may differ from what is described with respect to FIG. 6.

Figure 7:
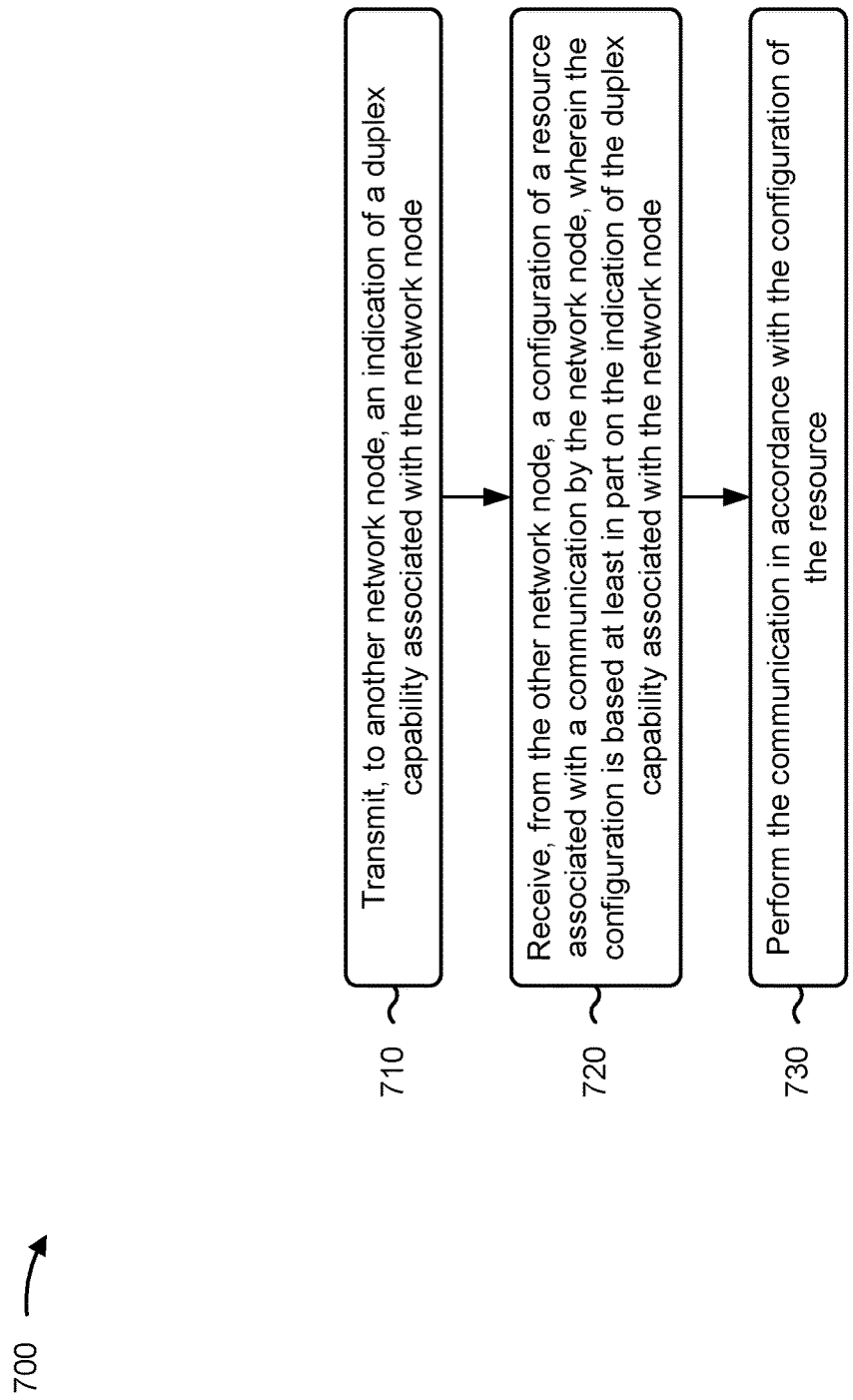
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., one of the base station 110 or network controller 130 described in connection with FIGS. 1 and 2, one of the base stations 310, 335, 345 described in connection with FIG. 3, one of the IAB donor 405 and/or the IAB nodes 410 described in connection with FIG. 4, one of the network devices 504 or network node 506 described in connection with FIG. 5, or a similar network node) performs operations associated with inter-node indication of full duplex capability.

As shown in FIG. 7, in some aspects, process 700 may include transmitting, to another network node, an indication of a duplex capability associated with the network node (block 710). For example, the network node (e.g., using communication manager 150 and/or transmission component 904, depicted in FIG. 9) may transmit, to another network node, an indication of a duplex capability associated with the network node, as described above.

As further shown in FIG. 7, in some aspects, process 700 may include receiving, from the other network node, a configuration of a resource associated with a communication by the network node, wherein the configuration is based at least in part on the indication of the duplex capability associated with the network node (block 720). For example, the network node (e.g., using communication manager 150 and/or reception component 902, depicted in FIG. 9) may receive, from the other network node, a configuration of a resource associated with a communication by the network node, wherein the configuration is based at least in part on the indication of the duplex capability associated with the network node, as described above.

As further shown in FIG. 7, in some aspects, process 700 may include performing the communication in accordance with the configuration of the resource (block 730). For example, the network node (e.g., using communication manager 150 and/or performance component 908, depicted in FIG. 9) may perform the communication in accordance with the configuration of the resource, as described above.

Process 700 may include additional aspects, such as any single aspect or any combination of aspects described below and/or in connection with one or more other processes described elsewhere herein.

In a first aspect, the network node is a distributed unit node.

In a second aspect, alone or in combination with the first aspect, the network node is associated with one or more TRPs, and the duplex capability is associated with at least one of the one or more TRPs.

In a third aspect, alone or in combination with one or more of the first and second aspects, the other network node is one of a central unit node, a neighbor distributed unit node, or an OAM node.

In a fourth aspect, alone or in combination with one or more of the first through third aspects, the indication of the duplex capability of the network node is relayed to the other network node via a UE.

In a fifth aspect, alone or in combination with one or more of the first through fourth aspects, the indication of the duplex capability of the network node indicates that the network node is capable of one of half duplex operation or full duplex operation.

In a sixth aspect, alone or in combination with one or more of the first through fifth aspects, the indication of the duplex capability of the network node indicates that the network node is capable of the full duplex operation, and the indication of the duplex capability of the network node further indicates at least one full duplex parameter associated with the full duplex operation.

In a seventh aspect, alone or in combination with one or more of the first through sixth aspects, the at least one full duplex parameter indicates that the network node is capable of communication using one of fully overlapping sub-bands, partially overlapping sub-bands, or non-overlapping sub-bands.

In an eighth aspect, alone or in combination with one or more of the first through seventh aspects, the at least one full duplex parameter indicates that the network node is capable of communication using non-overlapping sub-bands, and the at least one full duplex parameter further indicates an associated guard band for the non-overlapping sub-bands.

In a ninth aspect, alone or in combination with one or more of the first through eighth aspects, the at least one full duplex parameter indicates that the network node is capable of communication using partially overlapping sub-bands, and the at least one full duplex parameter further indicates a maximum overlapping bandwidth associated with the partially overlapping sub-bands.

In a tenth aspect, alone or in combination with one or more of the first through ninth aspects, the at least one full duplex parameter indicates at least one transmit and receive signal combination of fully duplexed communications supported by the network node.

In an eleventh aspect, alone or in combination with one or more of the first through tenth aspects, a first transmit and receive signal combination of the at least one transmit and receive signal combination of the fully duplexed communications includes at least one of an SSB communication or an uplink signal communication.

In a twelfth aspect, alone or in combination with one or more of the first through eleventh aspects, the first transmit and receive signal combination of the at least one transmit and receive signal combination of the fully duplexed communications includes the SSB communication, and the SSB communication is associated with discovery of an IAB node.

In a thirteenth aspect, alone or in combination with one or more of the first through twelfth aspects, a first combination of the at least one transmit and receive signal combination of the fully duplexed communications includes a reference signal communication, and the reference signal communication is associated with an inter-node CLI measurement.

In a fourteenth aspect, alone or in combination with one or more of the first through thirteenth aspects, a first transmit and receive signal combination of the at least one transmit and receive signal combination of the fully duplexed communications includes a PUSCH communication and a PDSCH communication.

In a fifteenth aspect, alone or in combination with one or more of the first through fourteenth aspects, the indication of the duplex capability of the network node indicates that the network node is capable of full duplex operation, and the resource associated with the communication by the network node is associated with simultaneous reception, by the network node, of an uplink signal, and transmission, by the network node, of a downlink signal.

In a sixteenth aspect, alone or in combination with one or more of the first through fifteenth aspects, the indication of the duplex capability of the network node is transmitted using at least one of an Xn interface or an F1 interface.

In a seventeenth aspect, alone or in combination with one or more of the first through sixteenth aspects, the network node is a distributed unit node, the other network node is a central unit node, and the indication of the duplex capability of the network node is transmitted directly between the distributed unit node and the central unit node.

In an eighteenth aspect, alone or in combination with one or more of the first through seventeenth aspects, the network node is a first distributed unit node, the other network node is a second distributed unit node, and the indication of the duplex capability of the network node is transmitted between the first distributed unit node and the second distributed unit node via one or more central unit nodes.

In a nineteenth aspect, alone or in combination with one or more of the first through eighteenth aspects, the indication of the duplex capability of the network node is transmitted using an OTA message.

In a twentieth aspect, alone or in combination with one or more of the first through nineteenth aspects, the network node is associated with at least two TRPs, and the indication of the duplex capability associated with the network node further indicates that the at least two TRPs are capable of full duplex operation and are non-co-located.

In a twenty-first aspect, alone or in combination with one or more of the first through twentieth aspects, a first set of SSB signals is associated with a first TRP of the at least two TRPs, a second set of SSB signals is associated with a second TRP of the at least two TRPs, and the indication of the duplex capability associated with the network node further indicates that the first set of SSB signals and the second set of SSB signals may be configured for full duplex inter-node CLI measurement.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
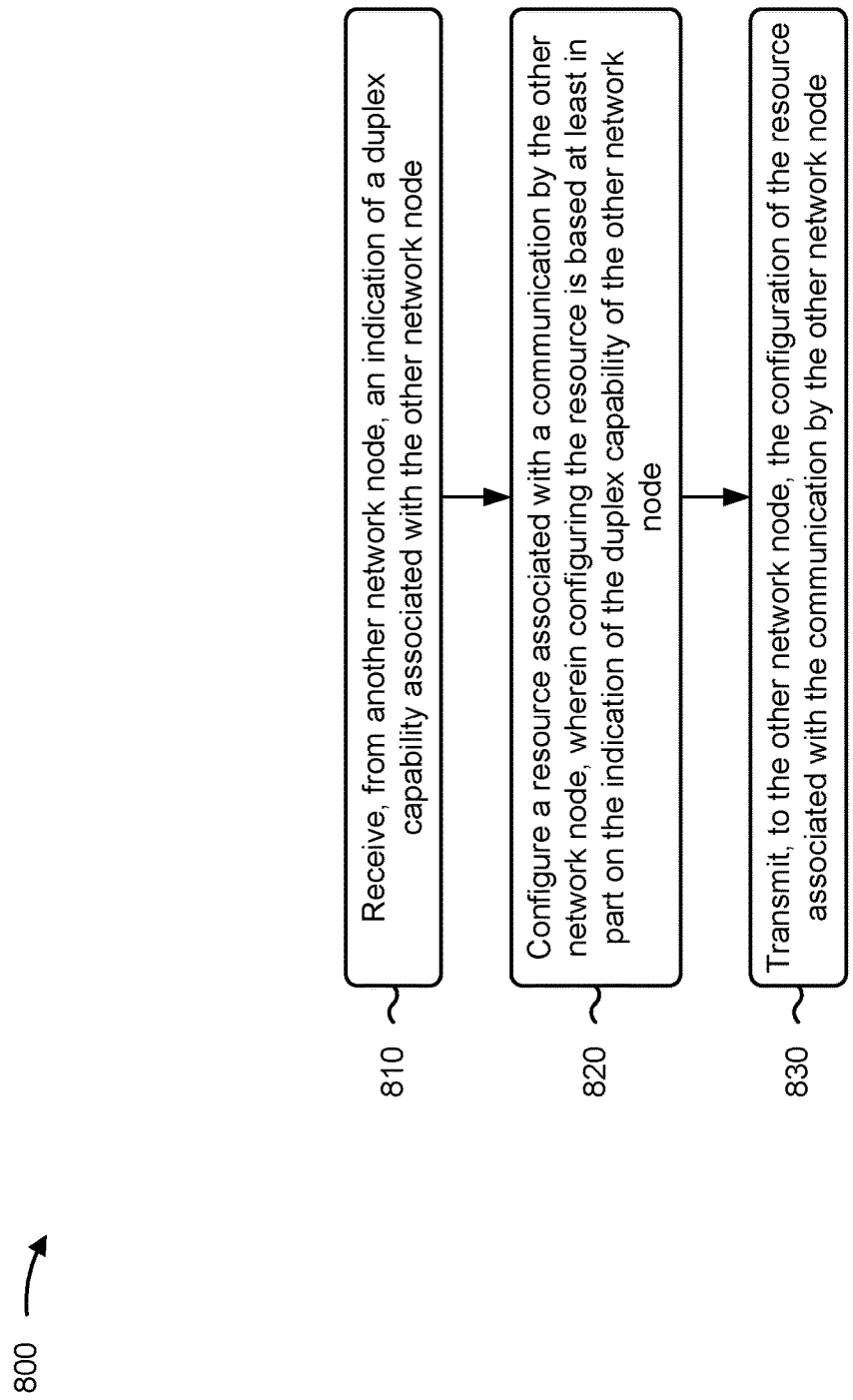
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., one of the base station 110 or network controller 130 described in connection with FIGS. 1 and 2, one of the base stations 310, 335, 345 described in connection with FIG. 3, one of the IAB donor 405 and/or the IAB nodes 410 described in connection with FIG. 4, one of the network devices 504 or network node 506 described in connection with FIG. 5, or a similar network node) performs operations associated with inter-node indication of full duplex capability.

As shown in FIG. 8, in some aspects, process 800 may include receiving, from another network node, an indication of a duplex capability associated with the other network node (block 810). For example, the network node (e.g., using communication manager 160 and/or reception component 1002, depicted in FIG. 10) may receive, from another network node, an indication of a duplex capability associated with the other network node, as described above.

As further shown in FIG. 8, in some aspects, process 800 may include configuring a resource associated with a communication by the other network node, wherein configuring the resource is based at least in part on the indication of the duplex capability of the other network node (block 820). For example, the network node (e.g., using communication manager 160 and/or configuration component 1008, depicted in FIG. 10) may configure a resource associated with a communication by the other network node, wherein configuring the resource is based at least in part on the indication of the duplex capability of the other network node, as described above.

As further shown in FIG. 8, in some aspects, process 800 may include transmitting, to the other network node, the configuration of the resource associated with the communication by the other network node (block 830). For example, the network node (e.g., using communication manager 160 and/or transmission component 1004, depicted in FIG. 10) may transmit, to the other network node, the configuration of the resource associated with the communication by the other network node, as described above.

Process 800 may include additional aspects, such as any single aspect or any combination of aspects described below and/or in connection with one or more other processes described elsewhere herein.

In a first aspect, the other network node is a distributed unit node.

In a second aspect, alone or in combination with the first aspect, the other network node is associated with one or more TRPs, and the duplex capability is associated with at least one of the one or more TRPs.

In a third aspect, alone or in combination with one or more of the first and second aspects, the network node is one of a central unit node, a neighbor distributed unit node, or an OAM node.

In a fourth aspect, alone or in combination with one or more of the first through third aspects, the indication of the duplex capability of the other network node is relayed to the network node via a UE.

In a fifth aspect, alone or in combination with one or more of the first through fourth aspects, the indication of the duplex capability of the other network node indicates that the other network node is capable of one of half duplex operation or full duplex operation.

In a sixth aspect, alone or in combination with one or more of the first through fifth aspects, the indication of the duplex capability of the other network node indicates that the other network node is capable of the full duplex operation, and the indication of the duplex capability of the other network node further indicates at least one full duplex parameter associated with the full duplex operation.

In a seventh aspect, alone or in combination with one or more of the first through sixth aspects, the at least one full duplex parameter indicates that the other network node is capable of communication using one of fully overlapping sub-bands, partially overlapping sub-bands, or non-overlapping sub-bands.

In an eighth aspect, alone or in combination with one or more of the first through seventh aspects, the at least one full duplex parameter indicates that the other network node is capable of communication using non-overlapping sub-bands, and the at least one full duplex parameter further indicates an associated guard band for the non-overlapping sub-bands.

In a ninth aspect, alone or in combination with one or more of the first through eighth aspects, the at least one full duplex parameter indicates that the other network node is capable of communication using partially overlapping sub-bands, and the at least one full duplex parameter further indicates a maximum overlapping bandwidth associated with the partially overlapping sub-bands.

In a tenth aspect, alone or in combination with one or more of the first through ninth aspects, the at least one full duplex parameter indicates at least one transmit and receive signal combination of fully duplexed communications supported by the other network node.

In an eleventh aspect, alone or in combination with one or more of the first through tenth aspects, a first transmit and receive signal combination of the at least one transmit and receive signal combination of the fully duplexed communications includes at least one of an SSB communication or an uplink signal communication.

In a twelfth aspect, alone or in combination with one or more of the first through eleventh aspects, the first combination of the at least one transmit and receive signal combination of the fully duplexed communications includes the SSB communication, and the SSB communication is associated with discovery of an IAB node.

In a thirteenth aspect, alone or in combination with one or more of the first through twelfth aspects, a first transmit and receive signal combination of the at least one transmit and receive signal combination of the fully duplexed communications includes a reference signal communication, and the reference signal communication is associated with an inter-node CLI measurement.

In a fourteenth aspect, alone or in combination with one or more of the first through thirteenth aspects, a first transmit and receive signal combination of the at least one transmit and receive signal combination of the fully duplexed communications includes a PUSCH communication and a PDSCH communication.

In a fifteenth aspect, alone or in combination with one or more of the first through fourteenth aspects, the indication of the duplex capability of the other network node indicates that the other network node is capable of full duplex operation, and the resource associated with the communication by the other network node is associated with simultaneous reception, by the other network node, of an uplink signal, and transmission, by the other network node, of a downlink signal.

In a sixteenth aspect, alone or in combination with one or more of the first through fifteenth aspects, the indication of the duplex capability of the other network node is transmitted using at least one of an Xn interface or an F1 interface.

In a seventeenth aspect, alone or in combination with one or more of the first through sixteenth aspects, the other network node is a distributed unit node, the network node is a central unit node, and the indication of the duplex capability of the other network node is transmitted directly between the distributed unit node and the central unit node.

In an eighteenth aspect, alone or in combination with one or more of the first through seventeenth aspects, the other network node is a first distributed unit node, the network node is a second distributed unit node, and the indication of the duplex capability of the other network node is transmitted between the first distributed unit node and the second distributed unit node via one or more central unit nodes.

In a nineteenth aspect, alone or in combination with one or more of the first through eighteenth aspects, the indication of the duplex capability of the other network node is transmitted using an OTA message.

In a twentieth aspect, alone or in combination with one or more of the first through nineteenth aspects, the other network node is associated with at least two TRPs, and the indication of the duplex capability associated with the other network node further indicates that the at least two TRPs are capable of full duplex operation and are non-co-located.

In a twenty-first aspect, alone or in combination with one or more of the first through twentieth aspects, a first set of SSB signals is associated with a first TRP of the at least two TRPs, a second set of SSB signals is associated with a second TRP of the at least two TRPs, and the indication of the duplex capability associated with the other network node further indicates that the first set of SSB signals and the second set of SSB signals may be configured for full duplex inter-node CLI measurement.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
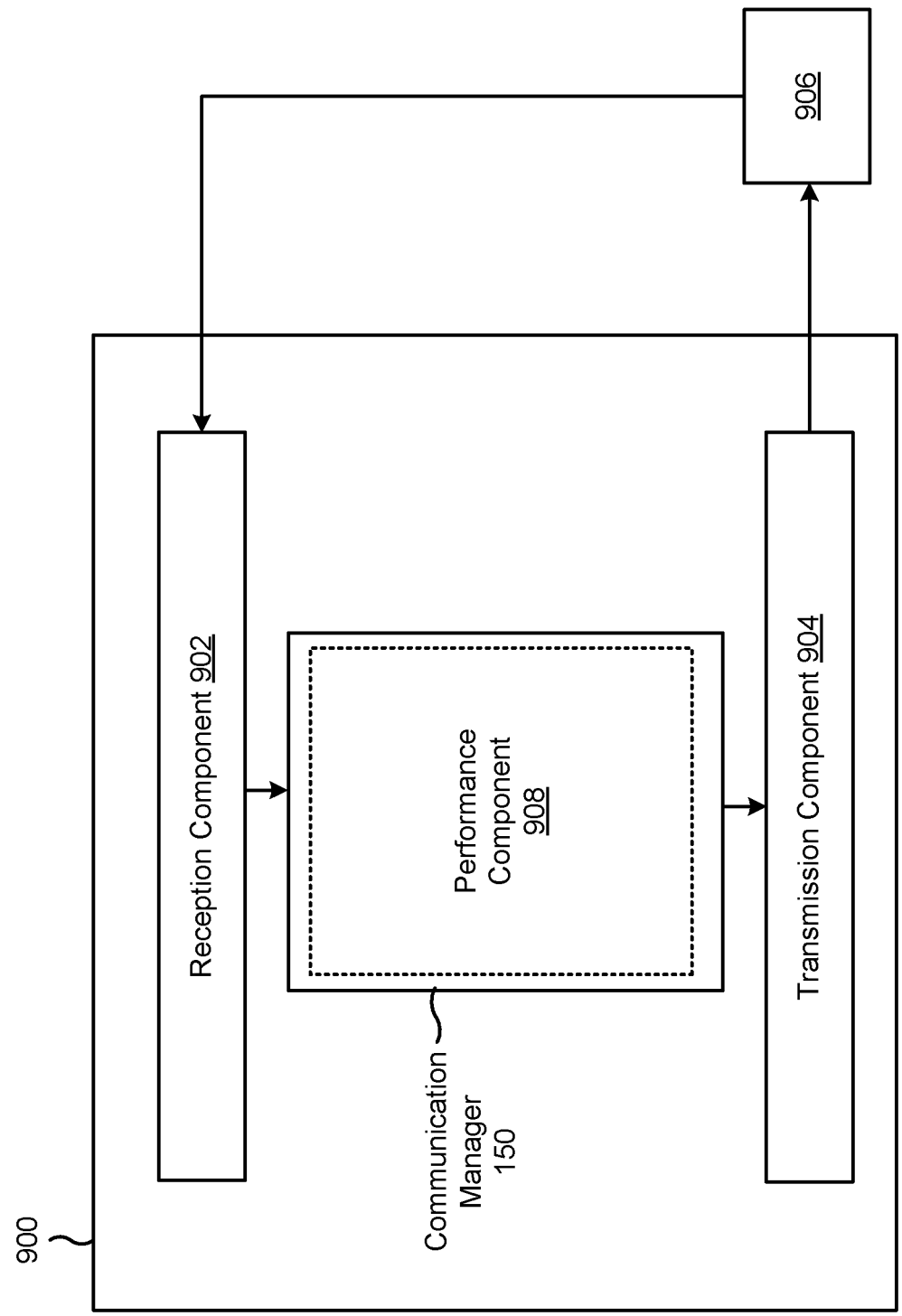
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a performance component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the base station 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station 110 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit, to another network node, an indication of a duplex capability associated with the network node. The reception component 902 may receive, from the other network node, a configuration of a resource associated with a communication by the network node, wherein the configuration is based at least in part on the indication of the duplex capability associated with the network node. The performance component 908 may perform the communication in accordance with the configuration of the resource.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
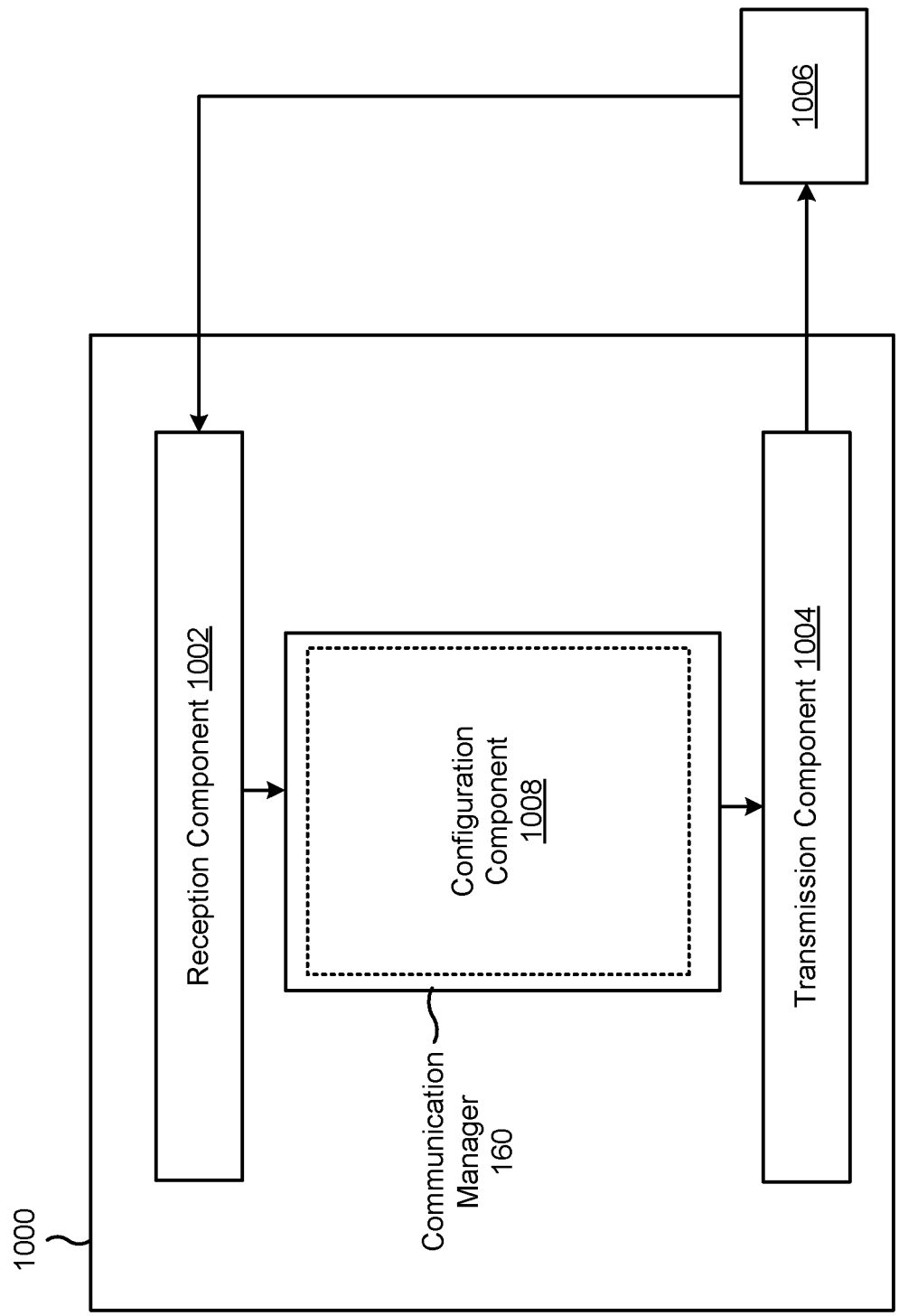
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 160. The communication manager 160 may include a configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the network controller 130 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network controller 130 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive, from another network node, an indication of a duplex capability associated with the other network node. The configuration component 1008 may configure a resource associated with a communication by the other network node, wherein configuring the resource is based at least in part on the indication of the duplex capability of the other network node. The transmission component 1004 may transmit, to the other network node, the configuration of the resource associated with the communication by the other network node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: transmitting, to another network node, an indication of a duplex capability associated with the network node; receiving, from the other network node, a configuration of a resource associated with a communication by the network node, wherein the configuration is based at least in part on the indication of the duplex capability associated with the network node; and performing the communication in accordance with the configuration of the resource.

Aspect 2: The method of Aspect 1, wherein the network node is a distributed unit node.

Aspect 3: The method of any of Aspects 1-2, wherein the network node is associated with one or more TRPs, and wherein the duplex capability is associated with at least one of the one or more TRPs.

Aspect 4: The method of any of Aspects 1-3, wherein the other network node is one of a central unit node, a neighbor distributed unit node, or an OAM node.

Aspect 5: The method of any of Aspects 1-4, wherein the indication of the duplex capability of the network node is relayed to the other network node via a UE.

Aspect 6: The method of any of Aspects 1-5, wherein the indication of the duplex capability of the network node indicates that the network node is capable of one of half duplex operation or full duplex operation.

Aspect 7: The method of Aspect 6, wherein the indication of the duplex capability of the network node indicates that the network node is capable of the full duplex operation, and wherein the indication of the duplex capability of the network node further indicates at least one full duplex parameter associated with the full duplex operation.

Aspect 8: The method of Aspect 7, wherein the at least one full duplex parameter indicates that the network node is capable of communication using one of fully overlapping sub-bands, partially overlapping sub-bands, or non-overlapping sub-bands.

Aspect 9: The method of Aspect 8, wherein the at least one full duplex parameter indicates that the network node is capable of communication using non-overlapping sub-bands, and wherein the at least one full duplex parameter further indicates an associated guard band for the non-overlapping sub-bands.

Aspect 10: The method of Aspect 8, wherein the at least one full duplex parameter indicates that the network node is capable of communication using partially overlapping sub-bands, and wherein the at least one full duplex parameter further indicates a maximum overlapping bandwidth associated with the partially overlapping sub-bands.

Aspect 11: The method of any of Aspects 7-10, wherein the at least one full duplex parameter indicates at least one transmit and receive signal combination of fully duplexed communications supported by the network node.

Aspect 12: The method of Aspect 11, wherein a first transmit and receive signal combination of the at least one transmit and receive signal combination of the fully duplexed communications includes at least one of an SSB communication or an uplink signal communication.

Aspect 13: The method of Aspect 12, wherein the first transmit and receive signal combination of the at least one transmit and receive signal combination of the fully duplexed communications includes the SSB communication, and wherein the SSB communication is associated with discovery of an IAB node.

Aspect 14: The method of Aspect 11, wherein a first transmit and receive signal combination of the at least one transmit and receive signal combination of the fully duplexed communications includes a reference signal communication, and wherein the reference signal communication is associated with an inter-node CLI measurement.

Aspect 15: The method of Aspect 11, wherein a first transmit and receive signal combination of the at least one transmit and receive signal combination of the fully duplexed communications includes a PUSCH communication and a PDSCH communication.

Aspect 16: The method of any of Aspects 1-15, wherein the indication of the duplex capability of the network node indicates that the network node is capable of full duplex operation, and wherein the resource associated with the communication by the network node is associated with simultaneous reception, by the network node, of an uplink signal, and transmission, by the network node, of a downlink signal.

Aspect 17: The method of any of Aspects 1-16, wherein the indication of the duplex capability of the network node is transmitted using at least one of an Xn interface or an F1 interface.

Aspect 18: The method of any of Aspects 1-17, wherein the network node is a distributed unit node, wherein the other network node is a central unit node, and wherein the indication of the duplex capability of the network node is transmitted directly between the distributed unit node and the central unit node.

Aspect 19: The method of any of Aspects 1-18, wherein the network node is a first distributed unit node, wherein the other network node is a second distributed unit node, and wherein the indication of the duplex capability of the network node is transmitted between the first distributed unit node and the second distributed unit node via one or more central unit nodes.

Aspect 20: The method of any of Aspects 1-19, wherein the indication of the duplex capability of the network node is transmitted using an OTA message.

Aspect 21: The method of any of Aspects 1-20, wherein the network node is associated with at least two TRPs, wherein the indication of the duplex capability associated with the network node further indicates that the at least two TRPs are capable of full duplex operation and are non-co-located.

Aspect 22: The method of Aspect 21, wherein a first set of SSB signals is associated with a first TRP of the at least two TRPs, wherein a second set of SSB signals is associated with a second TRP of the at least two TRPs, and wherein the indication of the duplex capability associated with the network node further indicates that the first set of SSB signals and the second set of SSB signals may be configured for full duplex inter-node CLI measurement.

Aspect 23: A method of wireless communication performed by a network node, comprising: receiving, from another network node, an indication of a duplex capability associated with the other network node; configuring a resource associated with a communication by the other network node, wherein configuring the resource is based at least in part on the indication of the duplex capability of the other network node; and transmitting, to the other network node, the configuration of the resource associated with the communication by the other network node.

Aspect 24: The method of Aspect 23, wherein the other network node is a distributed unit node.

Aspect 25: The method of any of Aspects 23-24, wherein the other network node is associated with one or more TRPs, and wherein the duplex capability is associated with at least one of the one or more TRPs.

Aspect 26: The method of any of Aspects 23-25, wherein the network node is one of a central unit node, a neighbor distributed unit node, or an OAM node.

Aspect 27: The method of any of Aspects 23-26, wherein the indication of the duplex capability of the other network node is relayed to the network node via a UE.

Aspect 28: The method of any of Aspects 23-27, wherein the indication of the duplex capability of the other network node indicates that the other network node is capable of one of half duplex operation or full duplex operation.

Aspect 29: The method of Aspect 28, wherein the indication of the duplex capability of the other network node indicates that the other network node is capable of the full duplex operation, and wherein the indication of the duplex capability of the other network node further indicates at least one full duplex parameter associated with the full duplex operation.

Aspect 30: The method of Aspect 29, wherein the at least one full duplex parameter indicates that the other network node is capable of communication using one of fully overlapping sub-bands, partially overlapping sub-bands, or non-overlapping sub-bands.

Aspect 31: The method of Aspect 30, wherein the at least one full duplex parameter indicates that the other network node is capable of communication using non-overlapping sub-bands, and wherein the at least one full duplex parameter further indicates an associated guard band for the non-overlapping sub-bands.

Aspect 32: The method of Aspect 30, wherein the at least one full duplex parameter indicates that the other network node is capable of communication using partially overlapping sub-bands, and wherein the at least one full duplex parameter further indicates a maximum overlapping bandwidth associated with the partially overlapping sub-bands.

Aspect 33: The method of any of Aspects 29-32, wherein the at least one full duplex parameter indicates at least one transmit and receive signal combination of fully duplexed communications supported by the other network node.

Aspect 34: The method of Aspect 33, wherein a first transmit and receive signal combination of the at least one transmit and receive signal combination of the fully duplexed communications includes at least one of an SSB communication or an uplink signal communication.

Aspect 35: The method of Aspect 34, wherein the first transmit and receive signal combination of the at least one transmit and receive signal combination of the fully duplexed communications includes the SSB communication, and wherein the SSB communication is associated with discovery of an IAB node.

Aspect 36: The method of Aspect 33, wherein a first transmit and receive signal combination of the at least one transmit and receive signal combination of the fully duplexed communications includes a reference signal communication, and wherein the reference signal communication is associated with an inter-node CLI measurement.

Aspect 37: The method of Aspect 33, wherein a first transmit and receive signal combination of the at least one transmit and receive signal combination of the fully duplexed communications includes a PUSCH communication and a PDSCH communication.

Aspect 38: The method of any of Aspects 23-37, wherein the indication of the duplex capability of the other network node indicates that the other network node is capable of full duplex operation, and wherein the resource associated with the communication by the other network node is associated with simultaneous reception, by the other network node, of an uplink signal, and transmission, by the other network node, of a downlink signal.

Aspect 39: The method of any of Aspects 23-38, wherein the indication of the duplex capability of the other network node is transmitted using at least one of an Xn interface or an F1 interface.

Aspect 40: The method of any of Aspects 23-39, wherein the other network node is a distributed unit node, wherein the network node is a central unit node, and wherein the indication of the duplex capability of the other network node is transmitted directly between the distributed unit node and the central unit node.

Aspect 41: The method of any of Aspects 23-40, wherein the other network node is a first distributed unit node, wherein the network node is a second distributed unit node, and wherein the indication of the duplex capability of the other network node is transmitted between the first distributed unit node and the second distributed unit node via one or more central unit nodes.

Aspect 42: The method of any of Aspects 23-41, wherein the indication of the duplex capability of the other network node is transmitted using an OTA message.

Aspect 43: The method of any of Aspects 23-42, wherein the other network node is associated with at least two TRPs, wherein the indication of the duplex capability associated with the other network node further indicates that the at least two TRPs are capable of full duplex operation and are non-co-located.

Aspect 44: The method of Aspect 43, wherein a first set of SSB signals is associated with a first TRP of the at least two TRPs, wherein a second set of SSB signals is associated with a second TRP of the at least two TRPs, and wherein the indication of the duplex capability associated with the other network node further indicates that the first set of SSB signals and the second set of SSB signals may be configured for full duplex inter-node CLI measurement.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
one or more memories; and
one or more processors, coupled to the one or more memories, which are configured, individually or in any combination, to:
transmit, to another network node, an indication of a duplex capability associated with the network node, wherein the network node is a distributed unit (DU) node and the DU node is associated with a plurality of transmission and reception points (TRPs), and wherein the duplex capability is associated with at least one of the plurality of TRPs, and wherein the indication of the duplex capability associated with the network node further indicates that at least two TRPs of the plurality of TRPs are capable of full duplex operation and are non-co-located;
receive, from the other network node, a configuration of a resource associated with a communication by the network node, wherein the configuration is based at least in part on the indication of the duplex capability associated with the at least one of the plurality of TRPs; and
perform the communication in accordance with the configuration of the resource.

2. The apparatus of claim 1, wherein the other network node is one of a central unit node, a neighbor distributed unit node, or an operation, administration, and maintenance (OAM) node.

3. The apparatus of claim 1, wherein the indication of the duplex capability associated with the network node is relayed to the other network node via a user equipment (UE).

4. The apparatus of claim 1, wherein the indication of the duplex capability associated with the network node indicates that the network node is capable of one of half duplex operation or full duplex operation.

5. The apparatus of claim 4, wherein the indication of the duplex capability associated with the network node indicates that the network node is capable of the full duplex operation, and wherein the indication of the duplex capability associated with the network node further indicates at least one full duplex parameter associated with the full duplex operation.

6. The apparatus of claim 5, wherein the at least one full duplex parameter indicates that the network node is capable of communication using one of fully overlapping sub-bands, partially overlapping sub-bands, or non-overlapping sub-bands.

7. The apparatus of claim 6, wherein the at least one full duplex parameter indicates that the network node is capable of communication using non-overlapping sub-bands, and wherein the at least one full duplex parameter further indicates an associated guard band for the non-overlapping sub-bands.

8. The apparatus of claim 6, wherein the at least one full duplex parameter indicates that the network node is capable of communication using partially overlapping sub-bands, and wherein the at least one full duplex parameter further indicates a maximum overlapping bandwidth associated with the partially overlapping sub-bands.

9. The apparatus of claim 5, wherein the at least one full duplex parameter indicates at least one transmit and receive signal combination of fully duplexed communications supported by the network node.

10. The apparatus of claim 9, wherein a first transmit and receive signal combination of the at least one transmit and receive signal combination of the fully duplexed communications includes at least one of a synchronization signal block (SSB) communication or an uplink signal communication.

11. The apparatus of claim 10, wherein the first transmit and receive signal combination of the at least one transmit and receive signal combination of the fully duplexed communications includes the SSB communication, and wherein the SSB communication is associated with discovery of an integrated access and backhaul (IAB) node.

12. The apparatus of claim 9, wherein a first transmit and receive signal combination of the at least one transmit and receive signal combination of the fully duplexed communications includes a reference signal communication, and wherein the reference signal communication is associated with an inter-node crosslink interference (CLI) measurement.

13. The apparatus of claim 9, wherein a first transmit and receive signal combination of the at least one transmit and receive signal combination of the fully duplexed communications includes a physical uplink shared channel (PUSCH) communication and a physical downlink shared channel (PDSCH) communication.

14. The apparatus of claim 1, wherein the indication of the duplex capability associated with the network node indicates that the network node is capable of full duplex operation, and wherein the resource associated with the communication by the network node is associated with simultaneous reception, by the network node, of an uplink signal, and transmission, by the network node, of a downlink signal.

15. The apparatus of claim 1, wherein the indication of the duplex capability associated with the network node is transmitted using at least one of an Xn interface or an F1 interface.

16. The apparatus of claim 1, wherein the network node is a distributed unit node, wherein the other network node is a central unit node, and wherein the indication of
the duplex capability associated with the network node is transmitted directly between the distributed unit node and the central unit node.

17. The apparatus of claim 1, wherein the network node is a first distributed unit node, wherein the other network node is a second distributed unit node, and wherein the indication of the duplex capability associated with the network node is transmitted between the first distributed unit node and the second distributed unit node via one or more central unit nodes.

18. The apparatus of claim 1, wherein the indication of the duplex capability associated with the network node is transmitted using an over the air (OTA) message.

19. The apparatus of claim 1, wherein a first set of synchronization signal block (SSB) signals is associated with a first TRP of the at least two TRPs, wherein a second set of SSB signals is associated with a second TRP of the at least two TRPs, and wherein the indication of the duplex capability associated with the network node further indicates that the first set of SSB signals and the second set of SSB signals may be configured for full duplex inter-node crosslink interference (CLI) measurement.

20. An apparatus for wireless communication at a network node, comprising:
one or more memories; and
one or more processors, coupled to the one or more memories, which are configured, individually or in any combination, to:
receive, from another network node, an indication of a duplex capability associated with the other network node, wherein the other network node is a distributed unit (DU) node and the DU node is associated with a plurality of transmission and reception points (TRPs), and wherein the duplex capability is associated with at least one of the plurality of TRPs, and wherein the indication of the duplex capability associated with the other network node further indicates that at least two TRPs of the plurality of TRPs are capable of full duplex operation and are non-co- located;

configure a resource associated with a communication by the other network node, wherein configuring the resource is based at least in part on the indication of the duplex capability associated with the other network node; and transmit, to the other network node, the configuration of the resource associated with the communication by the other network node.

21. The apparatus of claim 20, wherein the indication of the duplex capability associated with the other network node indicates that the other network node is capable of a full duplex operation, and wherein the indication of the duplex capability associated with the other network node further indicates at least one full duplex parameter associated with the full duplex operation.

22. The apparatus of claim 21, wherein the at least one full duplex parameter indicates that the other network node is capable of communication using one of fully overlapping sub-bands, partially overlapping sub-bands, or non-overlapping sub-bands.

23. The apparatus of claim 21, wherein the at least one full duplex parameter indicates at least one transmit and receive signal combination of fully duplexed communications supported by the other network node.

24. A method of wireless communication performed by a network node, comprising:

transmitting, to another network node, an indication of a duplex capability associated with the network node, wherein the network node is a distributed unit (DU) node and the DU node is associated with a plurality of transmission and reception points (TRPs), and wherein the duplex capability is associated with at least one of the plurality of TRPs, and wherein the indication of the duplex capability associated with the network node further indicates that at least two TRPs of the plurality of TRPs are capable of full duplex operation and are non-co-located;

receiving, from the other network node, a configuration of a resource associated with a communication by the network node, wherein the configuration is based at least in part on the indication of the duplex capability associated with at least one of the TRPs of the network node; and performing the communication in accordance with the configuration of the resource.

25. The method of claim 24, wherein the indication of the duplex capability associated with the network node indicates that the network node is capable of a full duplex operation, and wherein the indication of the duplex capability associated with the network node further indicates at least one full duplex parameter associated with the full duplex operation.

26. The method of claim 24, wherein the indication of the duplex capability associated with the network node indicates that the network node is capable of a half duplex operation.

27. The method of claim 24, wherein the other network node is one of a central unit node, a neighbor distributed unit node, or an operation, administration, and maintenance (OAM) node.

28. The method of claim 24, wherein a first set of synchronization signal block (SSB) signals is associated with a first TRP of the at least two TRPs, wherein a second set of SSB signals is associated with a second TRP of the at least two TRPs, and wherein the indication of the duplex capability associated with the network node further indicates that the first set of SSB signals and the second set of SSB signals may be configured for full duplex inter-node cross-link interference (CLI) measurement.

29. A method of wireless communication performed by a network node, comprising:

receiving, from another network node, an indication of a duplex capability associated with the other network node, wherein the other network node is a distributed unit (DU) node and the DU node is associated with a plurality of transmission and reception points (TRPs), and wherein the duplex capability is associated with at least one of the plurality of TRPs, and wherein the indication of the duplex capability associated with the other network node further indicates that at least two TRPs of the plurality of TRPs are capable of full duplex operation and are non-co-located;

configuring a resource associated with a communication by the other network node, wherein configuring the resource is based at least in part on the indication of the duplex capability associated with the other network node; and transmitting, to the other network node, the configuration of the resource associated with the communication by the other network node.

30. The method of claim 29, wherein the indication of the duplex capability associated with the other network node indicates that the other network node is capable of a full duplex operation, and wherein the indication of the duplex capability associated with the other network node further indicates at least one full duplex parameter associated with the full duplex operation.

* * * * *